United States Patent [19]

Romankiw et al.

[11] 4,295,173

[45] Oct. 13, 1981

[54] THIN FILM INDUCTIVE TRANSDUCER

[75] Inventors: Lubomyr T. Romankiw, Briarcliff Manor; David A. Thompson, South Salem, both of N.Y.

[73] Assignee: International Business Machines Corporation, Armonk, N.Y.

[21] Appl. No.: 83,182

[22] Filed: Oct. 18, 1979

[51] Int. Cl.³ .................... G11B 5/12; G11B 5/20; G11B 5/22
[52] U.S. Cl. .................... 360/125; 360/122; 360/123
[58] Field of Search ........ 360/125, 122, 123, 119–120, 360/126–127

[56] References Cited

U.S. PATENT DOCUMENTS 4,190,872  2/1980  Jones, Jr. et al. ............... 360/125

*Primary Examiner*—Alfred H. Eddleman
*Attorney, Agent, or Firm*—Graham S. Jones, II

[57] ABSTRACT

A thin film inductive transducer head includes a magnetic circuit with a pair of legs and inductive coils. The legs are thinner near the pole tip than in the back gap region. The legs are also narrower in the pole tip region than in the back gap region. Resolution is enhanced by the thin pole tips and saturation of the yoke structure is avoided by increasing the cross-sectional area of the yoke structure away from the pole tip region.

6 Claims, 5 Drawing Figures

THIN FILM INDUCTIVE TRANSDUCER

DESCRIPTION

1. Technical Field

This invention relates to thin film inductive transducers for recording and reading magnetic transitions on a moving magnetic recording medium.

An object of this invention is to increase the density of recording on a magnetic recording medium while maintaining a highly efficient magnetic flux path for the magnetic circuit including the legs of the head and the inductive coils.

Another object of this invention is to provide a high density recording head with a low reluctance magnetic circuit.

Another object of this invention is to provide a high density magnetic recording head with a reduced tendency to saturation of the yoke structure.

2. Related Applications Assigned to the Same Assignee

M. A. Church et al, Ser. No. 972,103, filed Dec. 21, 1978, now U.S. Pat. No. 4,219,854, entitled "Thin Film Magnetic Head Assembly."

R. E. Jones et al, Ser. No. 972,104, filed Dec. 21, 1978, U.S. Pat. No. 4,190,872 entitled "Thin Film Inductive Transducer."

BACKGROUND ART

Various configurations have heretofore been proposed to enhance efficiency of transducers of this type during recording and enhance the resolution of transitions during reading. U.S. Pat. Nos. 3,700,827 and 4,016,601 constitute the most pertinent prior art presently known to applicants relating to their transducer configuration.

U.S. Pat. No. 3,700,827 discloses a thin film magnetic head with a yoke structure that narrows from a back region to a pole tip region. In one embodiment, a separate magnetic core composed of a ferrite block (not a thin film) interconnects the yoke pieces at the back region. A wire coil encircles the magnetic core for activating the pole pieces during recording and transmitting electrical pulses activated in the coil during reading of magnetic transitions from a magnetic recording medium.

U.S. Pat. No. 4,016,601 discloses an integrated magnetic head assembly wherein the pole pieces have a reduced width in the pole tip region and a flat conductor winding coil extends between the pole piece layers. The reduction in width in the pole tip region is achieved by etch removal of concave portions of the substrate and pole pieces, such that the distance between the end of the pole tip and the wide portion of the yoke structure is greater than the thickness of one of the magnetic layers plus the magnetic gap.

This prior art does not suggest our improved thin film inductive transducer wherein resolution is maximized during reading by providing a pole tip region of preselected constant relatively narrow width comprising two thin magnetic layers that extend in a direction normal to the magnetic medium. The effects of spurious signals from adjacent tracks on the medium are minimized by having the pole tip region extend vertically away from the medium for at least several times the nominal recording wavelength. Saturation of the yoke structure with applied current is opposed and efficiency of the transducer is enhanced during recording by increasing the cross-sectional area of the yoke structure in the back region by progressively increasing its width rearward of the pole tip region and concurrently increasing the thickness of said magnetic layers.

DISCLOSURE OF INVENTION

A more comprehensive understanding of the invention and of the objects and advantages thereof will be apparent from the following description and accompanying drawings and appended claims.

Figure 1A:
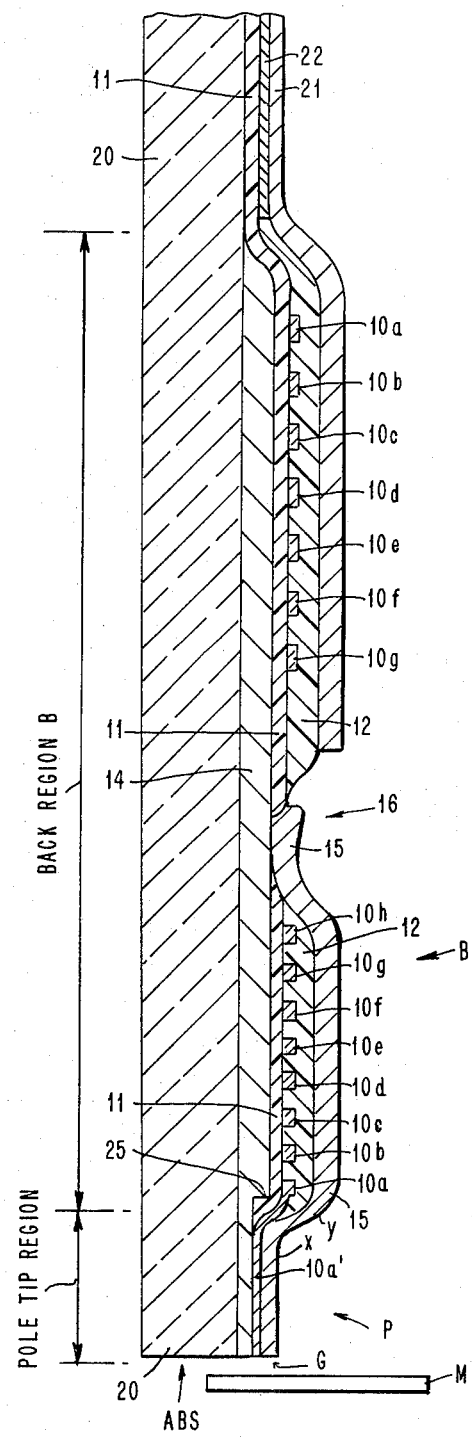
FIG. 1A is a fragmentary sectional view of a thin film inductive magnetic recording head in accordance with this invention. The view is taken along a section line 1A—1A in FIG. 1B.
Figure 1D:
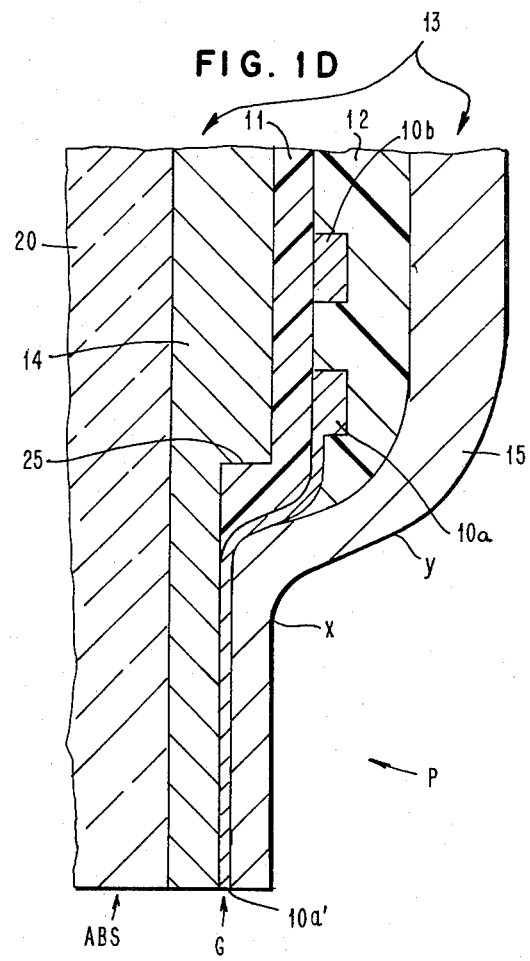
FIG. 1D is an enlarged fragmentary view of the pole tip portion of the head shown in FIG. 1A.

As illustrated in FIGS. 1A, B, C and D, the thin film transducer head embodying the invention comprises, briefly, flat conductor coils 10, FIGS. 1A and B having a plurality of bifilar turns 10a–h plated in a spiral pattern (FIG. 1B) between two layers 11, 12 of insulating material, FIGS. 1A and 1D, forming two electrically separate four-turn windings. This allows for a more balanced electrical center tap than would a single eight-turn spiral provided with a tap at the fourth turn.

A yoke structure 14, 15 (FIGS. 1A, 1C and 1D) consists of a pole tip region P and a back region B and comprises two magnetic leg layers 14, 15 of a magnetic material, such as permalloy (81:19 NiFe). Layers 14 and 15 are separated by insulating layers 11 and 12 except (a) at a back gap 16 in back region B, where layers 14 and 15 are in physical contact, and (b) at the pole tip region P where they are spaced by a thin conductor layer (turn 10a) of nonmagnetic material (preferably copper) to form a transducing gap. In the figures, layer 10a' is formed as a thinner portion of the layer 10a forming the spiral turns. The end of transducing gap G coincides with an air bearing surface (ABS) formed on a nonmagnetic slider 20 serving as a substrate upon which the above-described layers are deposited. Transducer gap G interacts in air bearing relation with a magnetic recording medium M, such as a rotatable magnetic disk, when the latter rotates and flies closely adjacent the ABS. Medium M is spaced by a distance less than the gap width from the gap G.

Figure 1B:
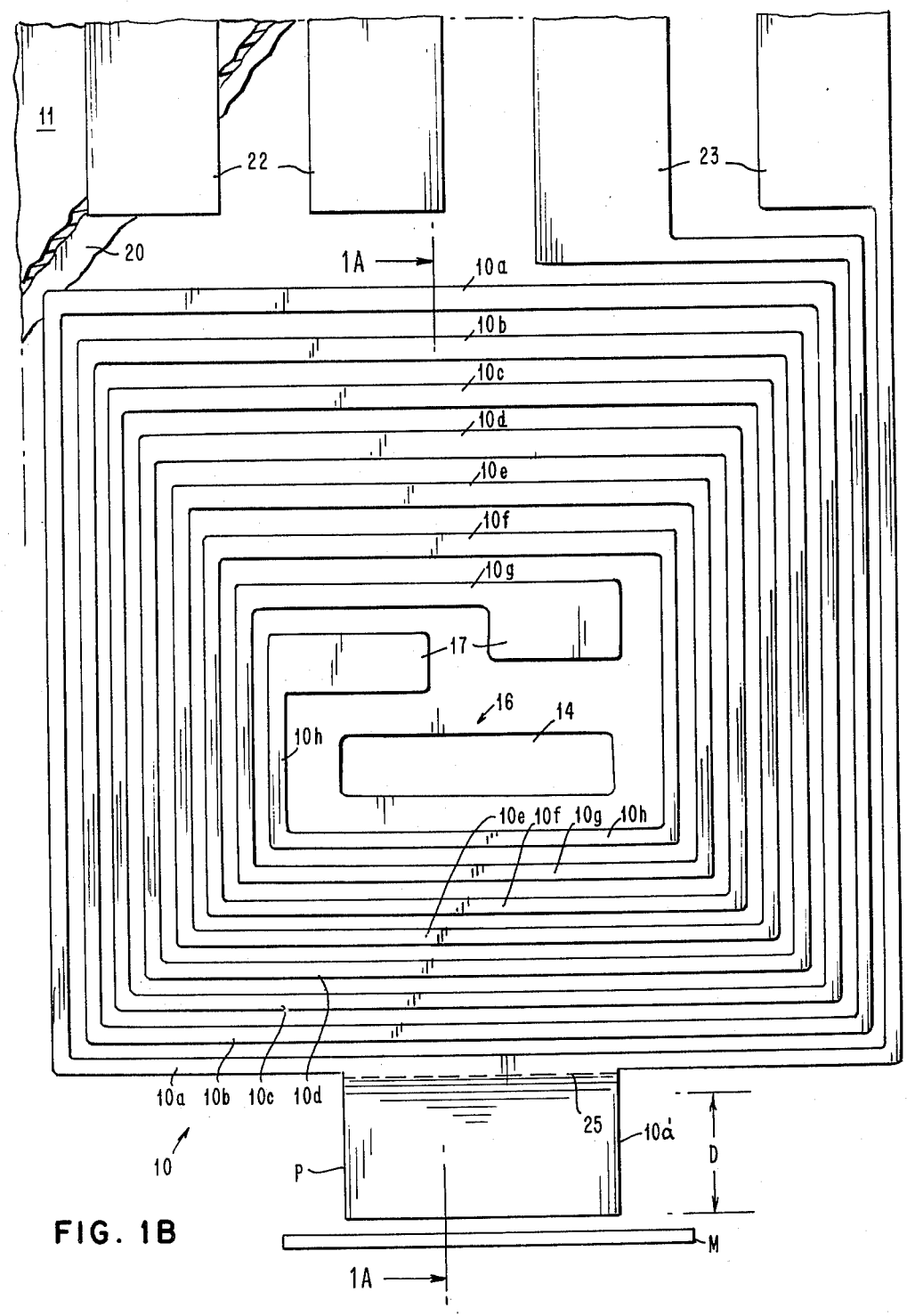
FIG. 1B is a plan view of the copper metallization of the head of FIG. 1A.
Figure 1C:
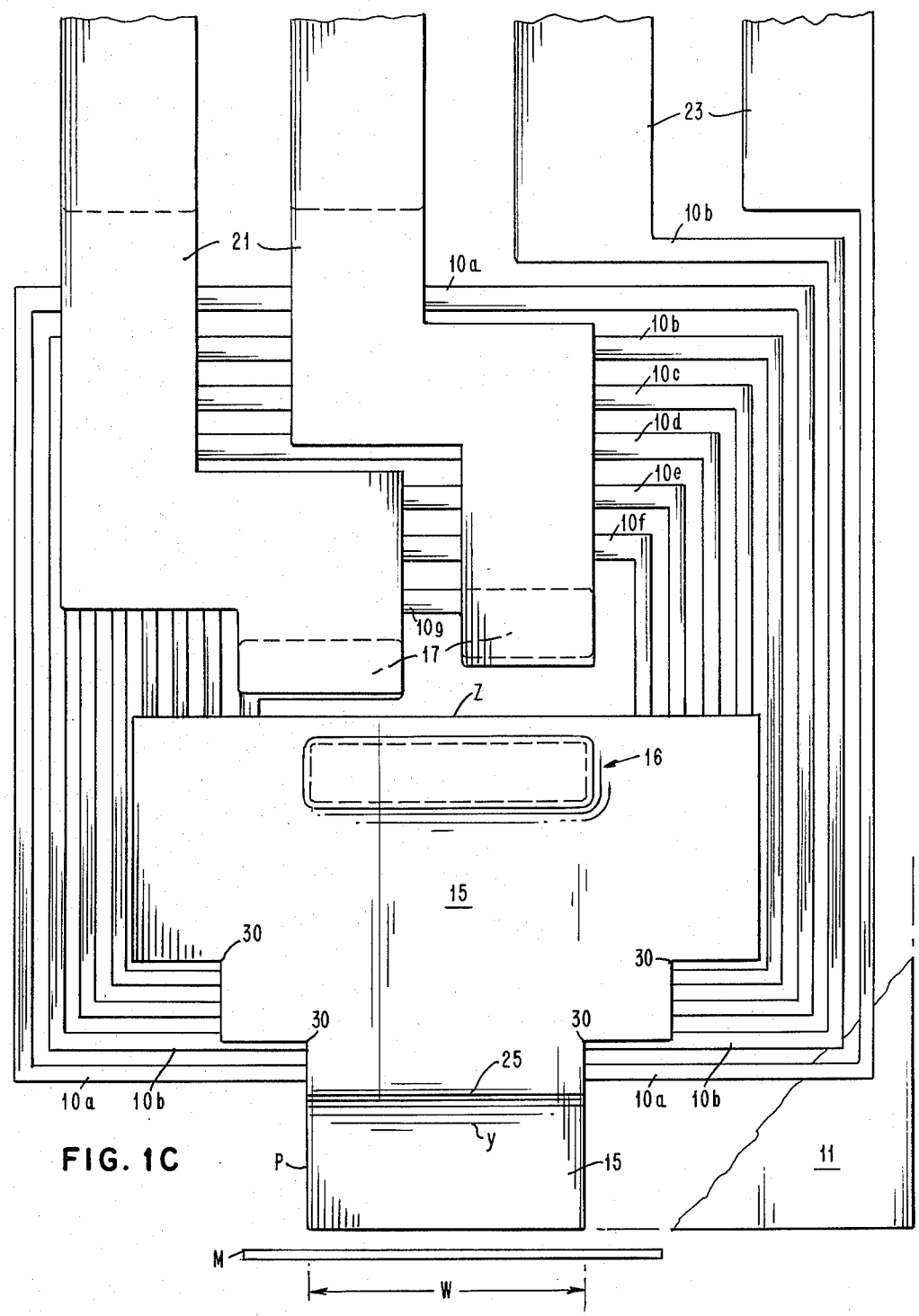
FIG. 1C is a plan view of the head as shown in FIG. 1C with an additional pattern of metal composed of a highly permeable magnetic material.

The transducer further comprises conductors 21 shown in FIGS. 1A and 1C that reach from electrical contact pads 22, FIG. 1B, to the central termination pads 17 of coils 10. The outermost turns 10a and 10b of coils 10 terminate in enlarged pad areas 23 which constitute electrical contacts. Members 22 and 23 are connected to external circuitry (not shown) for processing data signals during recording and reading.

In accordance with this invention, yoke structure 14, 15 is fabricated in the following manner. Magnetic leg layer 14 is deposited on slider 20 in two stages, using appropriate masks, to provide a deposit of reduced thickness in pole tip region P as indicated by line 25, FIGS. 1A–D. Insulating layer 11 is now deposited over magnetic layer 14 except at back gap 16 and the transducer gap G. Spiralling turns 10a–h of continuous flat conductor coils 10 are plated on insulating layer 11 as shown in FIG. 1B. Then a polymeric insulating layer 12 is deposited over the coils 10. This layer is smooth enough and thick enough to fill in the valleys between conductor coils 10, thereby providing a very smooth surface for depositing upper leg 15 of the magnetic yoke with minimal ripples from coils 10. Ripples can act as nucleation sites for domains and hang-up points for domain walls, causing unwanted noise in signals produced by the head. Referring to FIG. 1C, magnetic leg layer 15 and the permalloy layer of conductors 21 used for solder connections are then deposited over the now-insulated coil 10 except, as already noted, at back gap 16, where it makes physical contact with magnetic layer 14. Like layer 14, the layer 15 is deposited in two stages, using appropriate masks, so that its thickness in back region B is greater than that in pole tip region P as shown in FIGS. 1A and 1D.

The pole tip region P has a preselected substantially constant width W (FIG. 1C) which is equal to or slightly less than the width of a track on the associated magnetic medium M, and the pole tip region extends a relatively short distance D normal to medium M to maximize resolution of transitions during reading. Pole tip region P consists of a pole tip that extends from the ABS to a "zero throat point" X (FIG. 1A) and a pole tip extension that extends from point X to a "transition point" Y. Between these points X and Y, magnetic layer 15 diverges progressively from the plane of slider 20. Note that the downturned outward edges of insulating layers 11, 12 are caused by some flow of the material during deposition, which results in layer 15 having a somewhat curved cross section, but pole tip region P nevertheless preferably is maintained substantially constant at width W between points X and Y in FIG. 1A.

According to another important feature of the invention, in back region B that commences beyond point Y, the constant thickness of magnetic layers 14, 15 increases significantly over the preselected smaller thickness of these layers within pole tip region P. This is to oppose saturation of yoke structure 14, 15 when current is applied to coil 10 by providing a low reluctance magnetic circuit and to enhance efficiency of the transducer during recording by increasing the cross-sectional area of the yoke structure.

The cross-sectional area of the yoke structure 14, 15 is also increased by having the width of both layers 14, 15 progressively increase, preferably by having the edges of these layers diverge progressively rearward in steps 30 from point Y (see FIG. 1C) terminating in a wide end Z just beyond back gap 16. Yoke structure 13 shown in FIG. 1D thus has a configuration, in plan view, of stacked rectangles of progressive width which has (at its small dimension end) a narrow rectangle (pole tip region P).

The zero throat point X is that point at which the thickness of pole tip region P begins to increase. Transition point Y is that point at which the thickness of the magnetic layers 14 and 15 begins to increase and at which the magnetic layers begin to diverge and at which saturation would first occur during writing.

It will thus be seen that, with the instant improved thin film inductive transducer, yoke structure 14, 15 has a pole tip region P of a predetermined constant width corresponding substantially to the width of a track on the recording medium, with at least the portion between the ABS and point X being of a constant preselected small thickness and width, said pole tip region extending a relatively short distance D normal to the magnetic medium, thereby to maximize resolution of transitions during reading from the medium. This distance D must, however, be long enough to keep off-track reading at an acceptably low level. The yoke structure 14, 15 of the improved transducer also comprises a back region B that increases in width from said predetermined constant width. The leg layers 14, 15 of magnetic material in the back region are at least 50% thicker than their smaller thickness within the pole tip region P, thereby to oppose saturation of the yoke structure with applied current and to enhance the efficiency of the transducer during recording by increasing the cross-sectional area of the yoke structure.

Figure 2:
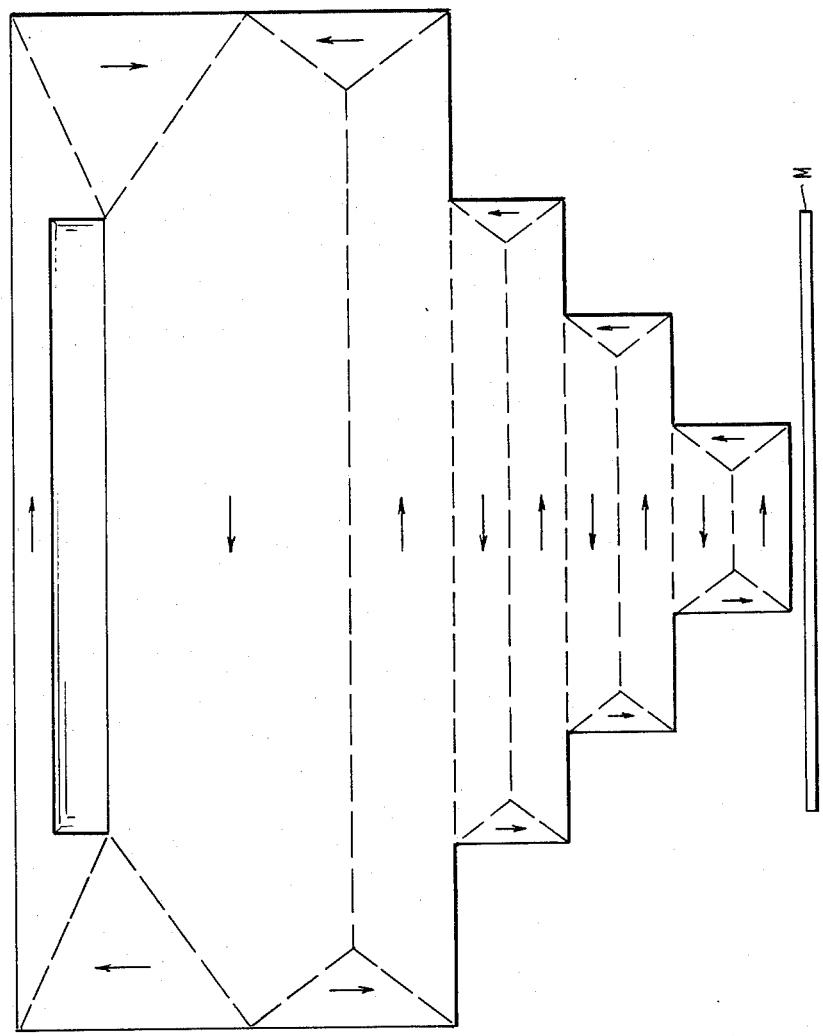
FIG. 2 is a schematic drawing of a modified yoke structure in accordance with this invention.

In magnetic recording heads having magnetic thin film yoke layers, it is desirable to have the magnetization oriented at right angles to the flux path. In thick films, the stable configuration, even with uniaxial anisotropy, is one where there are undesirably oriented closure domains near the edges as shown in FIG. 2. A purpose of this invention is to maximize the sensitivity of the head by minimizing the fraction of the magnetic signal path which is occupied by such closure domains. It is another purpose to minimize the random variation in sensitivity of the head and the signal distortions associated with changes in the domain structure by establishing one strongly preferred structure.

The desired domain structure is stabilized by the staircase edge configuration of the permalloy of the upper leg of the head as shown in FIG. 2. This could also be done with the lower leg or with both the lower and the upper legs. The step size of the staircase is selected to be slightly less than the size that a closure domain would have along the edge of a rectangular permalloy yoke piece. The corners act as nucleation points and anchors for the domain structure shown.

INDUSTRIAL APPLICABILITY

This invention is adapted for use in high density magnetic recording data storage systems for computer systems.

While the invention has been particularly shown and described with reference to a preferred embodiment thereof, it will be understood by those skilled in the art that various changes in form and detail may be made therein without departing from the spirit, scope and teaching of the invention. Accordingly, the transducer herein disclosed is to be considered merely as illustrative and the invention is to be limited only as specified in the claims.

Having thus described our invention, what we claim as new and desire to secure by Letters Patent is:

1. A thin film inductive transducer for recording and reading magnetic transitions on a selectable one of a plurality of tracks on a magnetic recording medium, said transducer being of the type comprising two layers of a magnetic material forming a yoke structure that is activated by a conductor coil characterized in that said yoke structure adjacent its one end comprises a pole tip region including a portion which is of a predetermined substantially constant width and a preselected substantially constant thickness, said predetermined width not exceeding the width of a track on the medium, said pole tip region extending a relatively short distance normal to the magnetic medium, thereby to maximize resolution of transitions during recording, and said yoke structure comprises a back region which joins said pole tip region and increases in width from said predetermined width and has a back gap adjacent its wider end, the thickness of the layers of magnetic material in said back region being greater than the thickness of those layers in said portion of said pole tip region, thereby to oppose saturation of the yoke structure with applied current and enhance efficiency of the transducer by increasing the cross-sectional area of the yoke structure.

2. A transducer according to claim 1 wherein said coil contains more than one turn, at least all but one of which are mutually insulating from each other and from said yoke structure by means of electrical insulation material.

3. A transducer according to claim 3 wherein said coil includes gaps between windings tending to cause ripples in said insulation material, said insulation material being composed of polymer materials with a smooth upper surface so as to provide a substantially smooth supporting surface for the subsequently deposited upper magnetic yoke layer, whereby said ripples are substantially filled over by said polymer materials.

4. A thin film inductive transducer for recording and reading magnetic transitions on a magnetic recording medium, said transducer being of the type comprising two layers of a magnetic material forming a yoke structure that is in a flux coupling relationship with a conductor coil characterized in that, said yoke structure comprises a pole tip region and a back gap region which are integrally joined together, said layers of magnetic material in said pole tip region being of a predetermined substantially constant width and a preselected substantially constant thickness, said pole tip region extending a relatively short distance normal to the magnetic medium, the thickness and the cross-sectional area of said layers of magnetic material in said back region being greater than the thickness and cross-sectional area of said layers of magnetic material in said pole tip portion, whereby said smaller cross-sectional area pole tip portions increase magnetic resolution of magnetic transitions during recording/reading and said larger thickness and cross-sectional area back gap layers oppose saturation of the yoke structure and enhance efficiency of the transducer by increasing the permeance by maximizing the cross-sectional area of the back gap region of the yoke structure.

5. A transducer according to claim 4 wherein said coil contains more than one turn, at least all but one of which are mutually insulated from each other and from said yoke structure by means of electrical insulation material.

6. A transducer according to claim 5 wherein said insulation material being composed of polymer materials with a substantially smooth upper surface so as to provide a smooth supporting surface for the subsequently deposited upper magnetic yoke layer, whereby said ripples are substantially filled over by said polymer materials.

* * * * *

UNITED STATES PATENT AND TRADEMARK OFFICE
CERTIFICATE OF CORRECTION

PATENT NO. : 4,295,173
DATED : October 13, 1981
INVENTOR(S) : L. T. Romankiw and D. A. Thompson It is certified that error appears in the above—identified patent and that said Letters Patent is hereby corrected as shown below:

Column 5, Claim 2, line 3, change "insulating" to read --insulated--

Column 5, Claim 3, line 1, the numeral "3" should be corrected to read --2--

Signed and Sealed this

Fourteenth Day of February 1984

[SEAL]

Attest:

GERALD J. MOSSINGHOFF

Attesting Officer

Commissioner of Patents and Trademarks

Disclaimer 4,295,173.—*Lubomyr T. Romankiw*, Briarcliff Manor and *David A. Thompson*, South Salem, N.Y. THIN FILM INDUCTIVE TRANSDUCER. Patent dated Oct. 13, 1981. Disclaimer filed Dec. 5, 1983, by the assignee, *International Business Machines Corp.*

The term of this patent subsequent to Feb. 26, 1997 has been disclaimed.
[*Official Gazette February 12, 1985.*]